(12) United States Patent
Fuechtling (10) Patent No.: US 9,161,492 B2
(45) Date of Patent: Oct. 20, 2015

(54) HEADER WITH A CONVEYOR BELT HAVING CONVEYOR BELT SUPPORTS CONFIGURED FOR IMPROVED SEALABILITY

(71) Applicant: CLAAS SELBSTFAHRENDE ERNTEMASCHINEN GMBH, Harsewinkel (DE)

(72) Inventor: Christian Fuechtling, Rinkerode (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 67 days.

(21) Appl. No.: 14/148,023

(22) Filed: Jan. 6, 2014

(65) Prior Publication Data
US 2014/0196427 A1      Jul. 17, 2014

(51) Int. Cl.
A01D 43/00    (2006.01)
A01D 43/06    (2006.01)
A01D 41/14    (2006.01)
A01D 61/00    (2006.01)

(52) U.S. Cl.
CPC ............... *A01D 43/06* (2013.01); *A01D 41/14* (2013.01); *A01D 61/002* (2013.01)

(58) Field of Classification Search
CPC ..... A01D 57/20; A01D 41/14; A01D 61/002; A01D 41/16
USPC .................... 56/181, 208, 153, 14.5
See application file for complete search history.

(56) References Cited

U.S. PATENT DOCUMENTS

| | | | |
|---|---|---|---|
| 1,454,551 A * | 5/1923 | Marriage | 56/125 |
| 6,675,568 B2 * | 1/2004 | Patterson et al. | 56/208 |
| 7,412,816 B2 * | 8/2008 | Coers et al. | 56/208 |
| 7,549,280 B2 * | 6/2009 | Lovett et al. | 56/208 |
| 7,600,364 B2 * | 10/2009 | Lovett et al. | 56/181 |
| 7,640,720 B1 * | 1/2010 | Lovett et al. | 56/181 |
| 7,805,921 B2 * | 10/2010 | Coers et al. | 56/364 |
| 7,886,511 B2 * | 2/2011 | Honas et al. | 56/181 |
| 7,886,512 B2 * | 2/2011 | Lohrentz et al. | 56/181 |
| 7,937,919 B2 * | 5/2011 | Coers et al. | 56/15.8 |
| 7,937,920 B2 | 5/2011 | Schmidt et al. | |
| 7,958,711 B1 * | 6/2011 | Sauerwein | 56/181 |
| 7,992,372 B1 * | 8/2011 | Coers et al. | 56/153 |
| 8,087,224 B1 * | 1/2012 | Coers et al. | 56/153 |
| 8,495,855 B1 * | 7/2013 | Conrad et al. | 56/181 |
| 8,573,388 B2 * | 11/2013 | Hoffman et al. | 198/814 |
| 8,752,359 B2 * | 6/2014 | Cormier et al. | 56/156 |
| 2002/0129591 A1 * | 9/2002 | Patterson et al. | 56/158 |
| 2007/0193243 A1 * | 8/2007 | Schmidt et al. | 56/181 |
| 2009/0320431 A1 * | 12/2009 | Puryk et al. | 56/181 |
| 2011/0308221 A1 * | 12/2011 | Sauerwein et al. | 56/181 |

* cited by examiner

*Primary Examiner* — Árpád Fábián-Kovács
(74) *Attorney, Agent, or Firm* — Michael J. Striker (57) ABSTRACT

A header has a middle section disposed on a main frame, at least two side sections adjacent to the middle section, a rear panel extending perpendicularly to the main frame, a flexible finger bar extending across a width of the header and a conveyor device disposed behind the finger bar. The conveyer device is designed on the side sections as a continuous conveyor belt disposed adjacent to the middle section in order to transport crop cut by the finger bar laterally in the direction of the middle section. The side sections are formed as a plurality of supporting arms swivellably disposed on the main frame that support the finger bar. Each side section has a plurality of supporting elements for supporting the conveyor belt. Each of the supporting elements is supported in a bearing point to be displaceable in the axial direction relative to the main frame.

13 Claims, 8 Drawing Sheets

HEADER WITH A CONVEYOR BELT HAVING CONVEYOR BELT SUPPORTS CONFIGURED FOR IMPROVED SEALABILITY

CROSS-REFERENCE TO A RELATED APPLICATION

The invention described and claimed hereinbelow is also described in German Priority Document DE 10 2013 100322.2, filed on Jan. 14, 2013. The German Priority Document, the subject matter of which is incorporated herein by reference, provides the basis for a claim of priority of invention under 35 U.S.C. 119(a)-(d).

BACKGROUND OF THE INVENTION

The invention relates broadly to a header with a middle section disposed on a main frame and at least two side sections disposed adjacent to the middle section, a rear panel extending substantially perpendicularly to the main frame, a flexible finger bar extending across the width of the header and at least one conveyor device disposed behind the finger bar, where the at least one conveyor device is designed, on the respective side sections, as at least one continuous conveyor belt and where the conveyor belt(s) is/are disposed adjacent to the middle section in order to transport crop cut by the finger bar laterally in the direction of the middle section.

Header of this type are used to smoothly feed lame quantities of crop harvested and picked up by the header across large working widths to a harvesting machine for processing. In order to achieve good ground tracking by the header on uneven terrain, a plurality of supporting arms, which jointly carry the finger bar and the belt, are disposed on the main frame of the header such that these supporting arms can execute a wave-shaped motion, as viewed in the longitudinal direction of the header, in order to track the ground contour.

Such a known header is known from U.S. Pat. No. 7,937,920 B2. The header comprises a frame formed of transverse and longitudinal carriers and having middle section and at least two side sections, on each of which conveyor belts placed in order to convey crop. A supporting arm is disposed on the particular longitudinal carrier in a manner permitting rotation about a horizontal axis, wherein this supporting arm extends toward the front, perpendicularly to this longitudinal carrier. At the front end thereof, the supporting arms are connected to a flexible finger bar, which extends across the width of the header. Rollers, which lie in the same plane as the supporting arms and which are used to drive the belt, are disposed on the end of the particular side section. The rollers are supported by the directly adjacently disposed supporting arms. The conveyor belt wraps around the rollers as well as the supporting arms.

In order to track the ground contour, the supporting arms are deflected in the vertical direction and, therewith, the finger bar and the conveyor belt (both of which are supported by the supporting arms). In response to a deflection of the supporting arms, the finger bar tracks the ground contour in a wave-shaped motion, while the conveyor belt tightens between mutually adjacent supporting arms and follows a linear course. The belt guidance and the belt sealing are made difficult as a result. For example, gaps can form between the conveyor belt and sealing elements on the front side of the header, through which gaps crop enters the space between the top side and the underside of the conveyor belt. In addition, the conveyor belt is exposed, at some points, to greater loads due to friction and deformation, thereby increasing the wear on the conveyor belt.

SUMMARY OF THE INVENTION

The present invention overcomes the shortcomings of known arts, such as those mentioned above.

To that end, the present invention provides a header with many features of the aforementioned conventional header but modified and improved in order that the conveyor belt can better track a deflection of the arms supporting the finger bar, thereby enabling a better seal to be achieved as well as a reduction of the wear on this conveyor belt.

In an embodiment, the inventive header comprises a middle section disposed on a main frame and at least two side sections disposed adjacent to the middle section, a rear panel extending substantially perpendicularly to the main frame, a flexible finger bar extending across the width of the header and at least one conveyor device disposed behind the finger bar, where the at least one conveyor device is designed, on the respective side sections, as at least one continuous conveyor belt and where the conveyor belt(s) is/are disposed adjacent to the middle section in order to transport crop cut by the finger bar laterally in the direction of the middle section.

Each side section also comprises a plurality of supporting elements. The supporting elements support the conveyor belt and are supported in a bearing point such that these supporting elements are displaceable in the axial direction relative to the main frame. The displaceability of the supporting elements in response to a vertical deflection of the finger bar makes tracking by the conveyor belt possible according to the course of motion occurring upon deflection of the finger bar. Hence, the conveyer belt so designed is largely prevented from tightening between mutually adjacent supporting elements, thereby resulting in improved sealability. The improved sealability reduces wear on the conveyor belt.

Preferably, the bearing point of the particular supporting element is designed as a sliding joint. The gliding joint permits translatory motion as well rotational motion about the longitudinal axis of the supporting arm makes it possible for the front conveyor belt section (which faces the finger bar) to better adapt to the wave-shaped motion occurring upon deflection of the finger bar. The gap formation is markedly reduced as a result.

In another embodiment, every supporting element comprises a contact surface for the conveyor belt on the end section of this supporting element facing the finger bar. This arrangement serves to guide the conveyor belt, which is supported by the supporting elements. Preferably, every supporting element comprises a belt guide on the end section thereof facing the rear panel, which also serves to guide the conveyor belt.

The supporting elements are movable relative to the belt guide. The individual supporting elements therefore better follow the movement of the finger bar, wherein the guidance of the conveyor belt between the belt guide and the contact surface are less influenced thereby. This occurs in the invention because contraction of the conveyor belt is reduced in that the separation between the belt guide and the contact surface is approximately retained.

In another embodiment, the belt guide is penetrated by the supporting elements.

Advantageously, the belt guide is designed as at least one profiled, plate-shaped segment, which extends, in sections, in the longitudinal direction of the particular supporting element. The at least one plate-shaped segment is useable as a contact surface for the conveyor belt, which, together with the plurality of supporting elements, forms a virtually full-surface underlayer for a portion of the conveyor belt.

In one embodiment, the segment comprises a guide recess extending parallel to the main frame. This guide recess is used to a accommodate a corresponding guide element on the inner side of the conveyor belt facing the supporting arms. This results in reliable guidance of the conveyor belt in order to prevent displacement of the conveyor belt transversely to the conveying direction thereof, to the greatest extent possible.

Furthermore, the segment can comprise recesses that extend parallel to the supporting elements and are disposed at a distance from one another. The recesses are preferably designed as slots and permit a high level of torsional and bending flexibility of the belt guide. This is particularly advantageous, since the pivot point of the supporting arms, which support the finger bar, is clearly separated from the belt guide on the supporting elements.

In an embodiment, the recesses are disposed on both sides of the guide recess. The recesses are implemented as laser incisions, for example, which is favorable in terms of fabrication.

Preferably, the segment comprises a wall that extends in sections, perpendicularly to the surface thereof and parallel to the main frame.

In particular, a plurality of crop-guiding elements are distributed across the width of the finger bar, disposed next to one another and slanted at an angle with respect to this finger bar. These crop-guiding elements are used to redirect crop cut by the finger bar in the direction of the conveyor belt.

Preferably, every crop-guiding element comprises a front edge (which lies approximately parallel to the top side of the conveyor belt) and at which a continuous sealing belt is fastened. The sealing belt extends across the width of the particular at least one side section of the header and overlapping the conveyor belt at least in sections.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, and alternatives falling within the spirit and scope of the present invention, as defined by the appended claims.

As mentioned above, FIG. 1 depicts a schematic, partially exposed view of a header 1 according to the invention. The header 1 comprises a main frame 2, on which a middle section 3 and at least two side sections 4 adjacent to the middle section 3 are disposed. A continuous, flexible finger bar 6 extends substantially across the entire width of the header 1, including the middle section 3 and the side sections 4 on the front side of the header 1 opposite the main frame 2. Non-illustrated reels are disposed on the main frame 2 of the header 1, which extend across the width of one side section 4 and partially across the width of the middle section 3. The reels are used to improve the intake of the crop by the finger bar 6.

Figure 1:
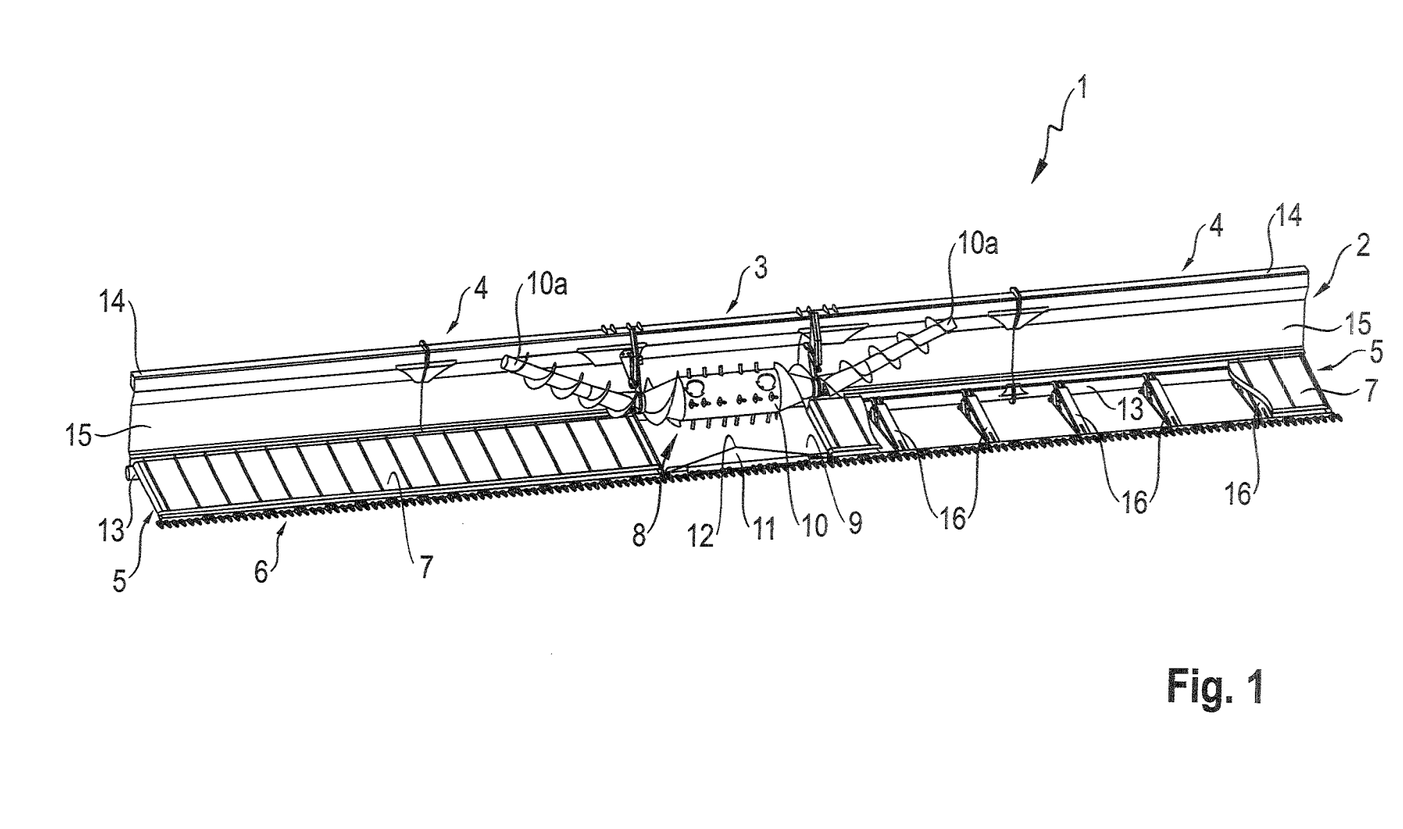
FIG. 1 depicts a schematic, partially exposed view of a header constructed according to the invention.

Crop cut by the finger bar 6 is fed to a conveyor device 5 disposed behind the finger bar 6. The conveyor device comprises at least one endlessly circulating conveyor belt 7 on the respective side sections 4. The endlessly circulating conveyor belts 7 are disposed adjacent to the middle section 3 in order to transport the crop cut by the finger bar 6 parallel to the longitudinal axis of the header 1 in the direction of the middle section 3, where this crop is fed to an intake conveyor device 8. The intake conveyor device 8 is designed as a driveable feed roller 10, to which laterally outwardly extending header augers 10a are assigned. The intake conveyor device 8 conveys the crop that has been delivered laterally by the endless conveyor belts 7 to the middle section 3 to an opening that is located in the main frame 2 and is disposed behind the feed roller 10. Crop is transferred through this opening via a feeder housing, which is located on a non-illustrated combine harvester and to which the header 1 can be attached, to the combine harvester for further processing.

The middle section comprises floor plate 9, which has contoured design on the top side thereof facing the feed roller 10, which is disposed above the floor plate 9. The underside of the floor plate 9 facing the ground is substantially planar. The contoured top side of the floor plate 9 comprises a wedge-shaped, raised projection 11. The projection 11 tapers from the front edge of the header 1 in the direction of the intake conveyor device 8 and leads into a tip 12 facing the feed roller 10. The projection 11 is used to forcibly redirect the crop in order to redirect the crop delivered by the belts 7 into the intake region of the intake conveyor device 8 and thereby improve the crop intake. The height of the projection 11 varies in order to ensure that crop is sufficiently redirected.

As shown in FIG. 1, one side section 4 is partially exposed in order to show the structure of the header 1 located underneath the conveyor belt 7. The design of the side parts 4 is identical, and so only one side part 4 is shown, in a partial cross-section. The main frame 2 comprises rear panels 15, which extend vertically with respect to the direction of motion of the conveyor belt 7 and, which are enclosed between preferably hollow cylindrical profiled elements 13, 14. In the middle section 3, the intake conveyor device 8 is disposed at the profiled elements 13, 14 of the main frame 2. Each side section 4 comprises a plurality of supporting arms 16, which are disposed on the main frame 2 in a manner pivotable about a horizontal axis. The supporting arms 16 of the particular side section 4 support the flexible finger bar 6 and are deflected together with this finger bar in the vertical direction when the header 1 is guided over the ground in a harvesting operation. The finger bar 6 is rigidly connected to the particular supporting arm 16.

Figure 2:
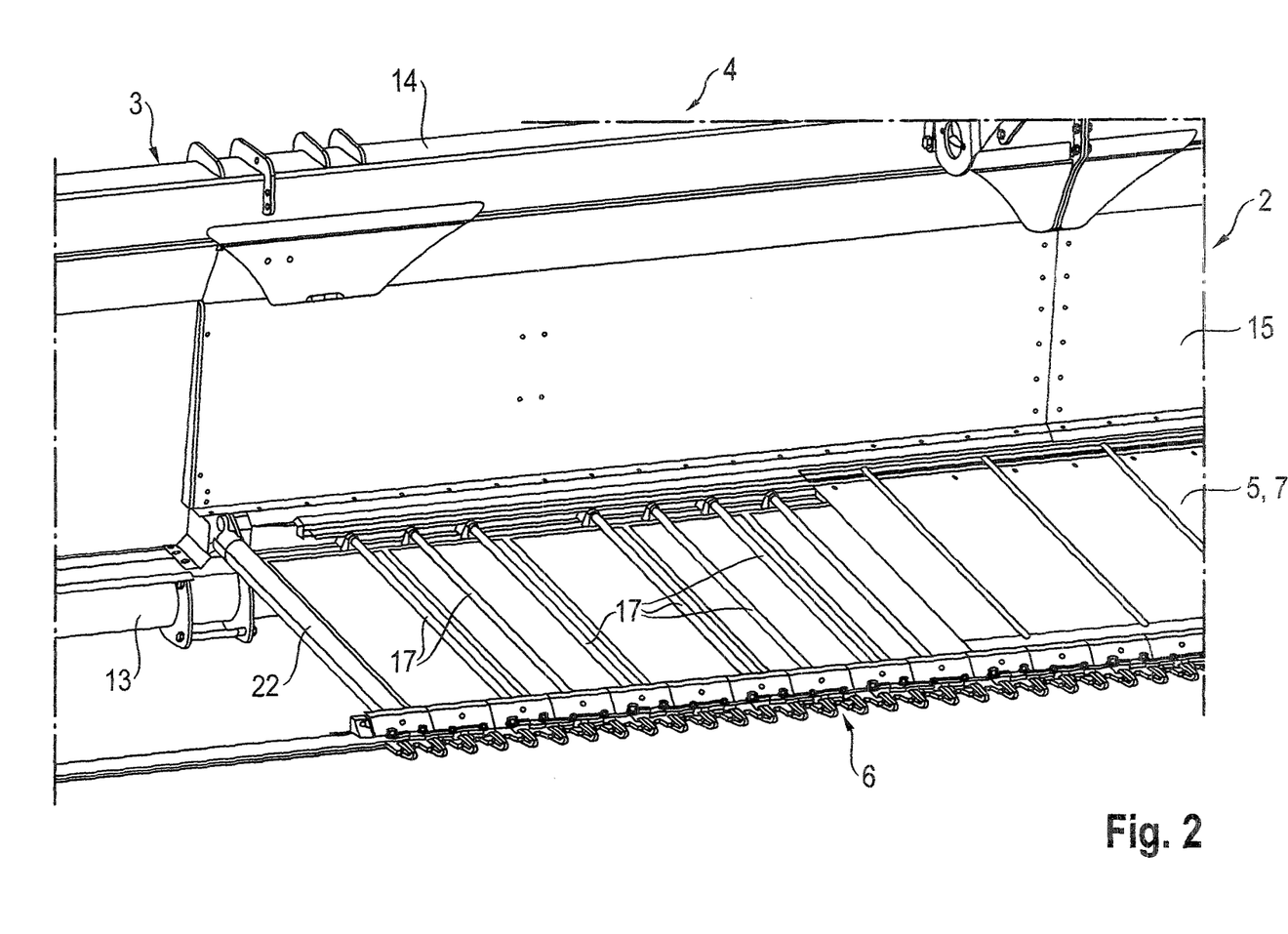
FIG. 2 depicts a partial view of a side section of the header according to FIG. 1.

FIG. 2 depicts a partial view of a side section 4 of the header according to FIG. 1. The design and arrangement of the conveyor device 5 of the side sections 4, which comprises at least one endlessly circulating conveyor belt 7, shall be explained by reference to FIG. 2. The conveyor belt 7 is supported by a plurality of separate supporting elements 17, which are disposed above the supporting arms 16 and extend through the circulating conveyor belt 7. The supporting elements 17 are supported in the main frame 2 and therefore enable the conveyor belt 7 to undergo a vertical compensation motion when the header 1 is guided over the ground in the harvesting operation, as described in detail further below. The supporting elements 17, which lie in a plane above the supporting arms 16, extend parallel to these supporting arms in the direction of the finger bar 6. The drive and the redirection of the conveyor belt 7 take place on both sides of the particular side section 4 by means of guide rollers 22. At least one of the drive rollers is driveable, in order to drive the conveyor belt 7 in an endlessly circulating manner.

Figure 3:
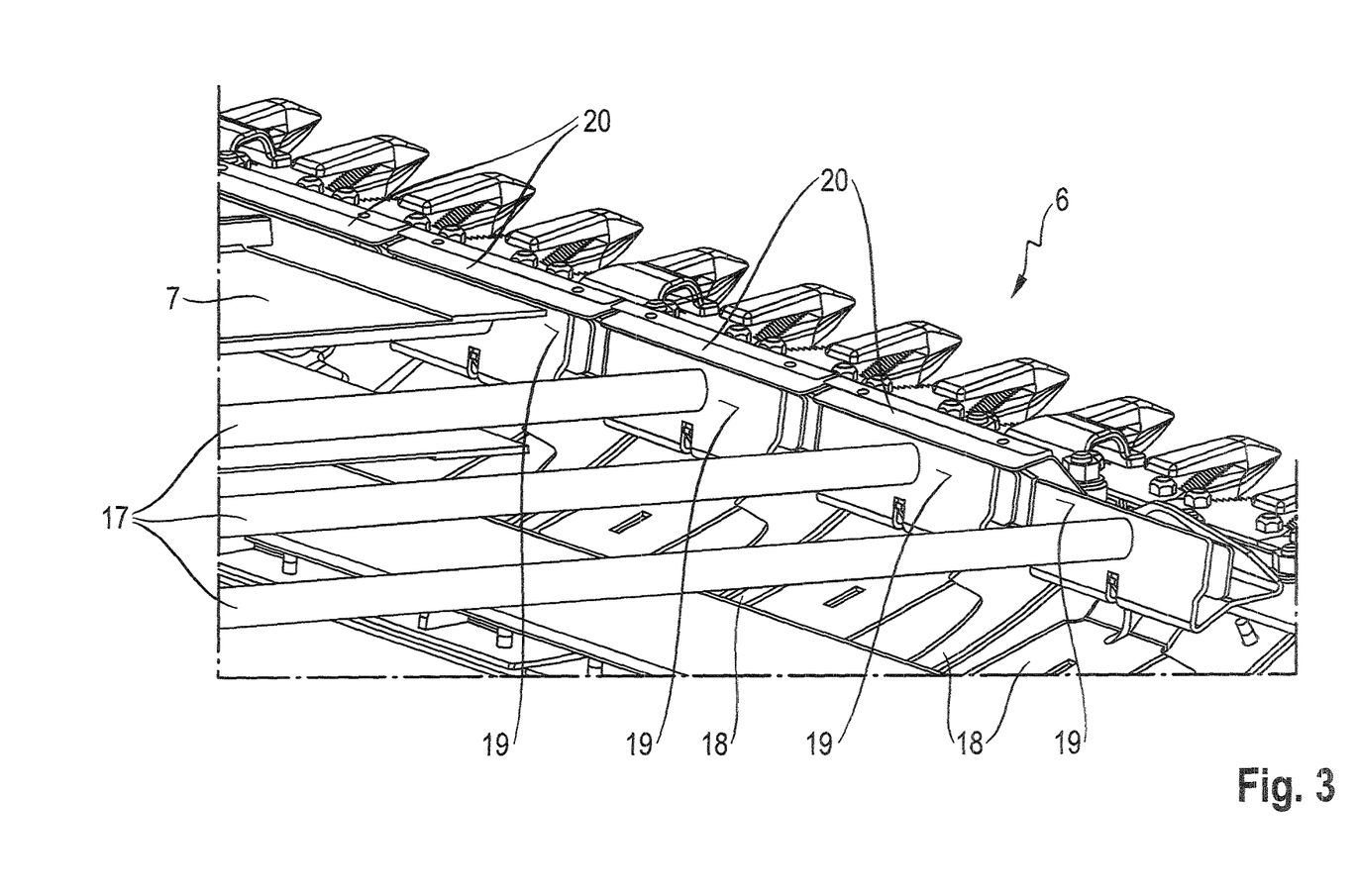
FIG. 3 depicts a partially exposed view of the front side of the header, diagonally from above.

The depiction in FIG. 3 presents a partially exposed view of the front side of the header 1, diagonally from above. As is apparent from FIG. 3, each supporting element 17 extending in the direction of the finger bar 6 comprises a contact surface 19 for the conveyor belt 7 at the end section thereof facing the finger bar 6. In the exemplary embodiment shown, the contact surface 19 is designed as a profiled plate, which is disposed at a feed plate 20 fastened on the finger bar 6. As viewed across the width of the header 1, a plurality of feed plates 20 are disposed next to one another, wherein these feed plates are designed to redirect crop cut by the finger bar 6 to the conveyor belt 7. The contact surface 19 extends, at least in sections, perpendicularly to the longitudinal axis of the supporting elements 17. Therefore, the conveyor belt 7 bears, via the edge thereof extending transversely to the direction of circulation of the conveyor belt 7, against the contact surface 19 and is supported thereby. The feed plates 20 extend above the contact surface 19 in the vertical direction in order to prevent crop from entering the region between the contact surfaces 19 and the finger bar 6. Header skid shoes 18 are disposed underneath the supporting elements 17 and are connected at one end to the finger bar 6 and, at the other end thereof, are swivellably coupled to the particular supporting arm 16. The header 1 is guided over the ground with the header skid shoes 18, which undergo a deflection due to irregularities in the ground. The skid shoe deflections are transferred to the supporting arms 16 and result in a vertical deflection of the knife bar 6 and the conveyor belt 7.

Figure 4:
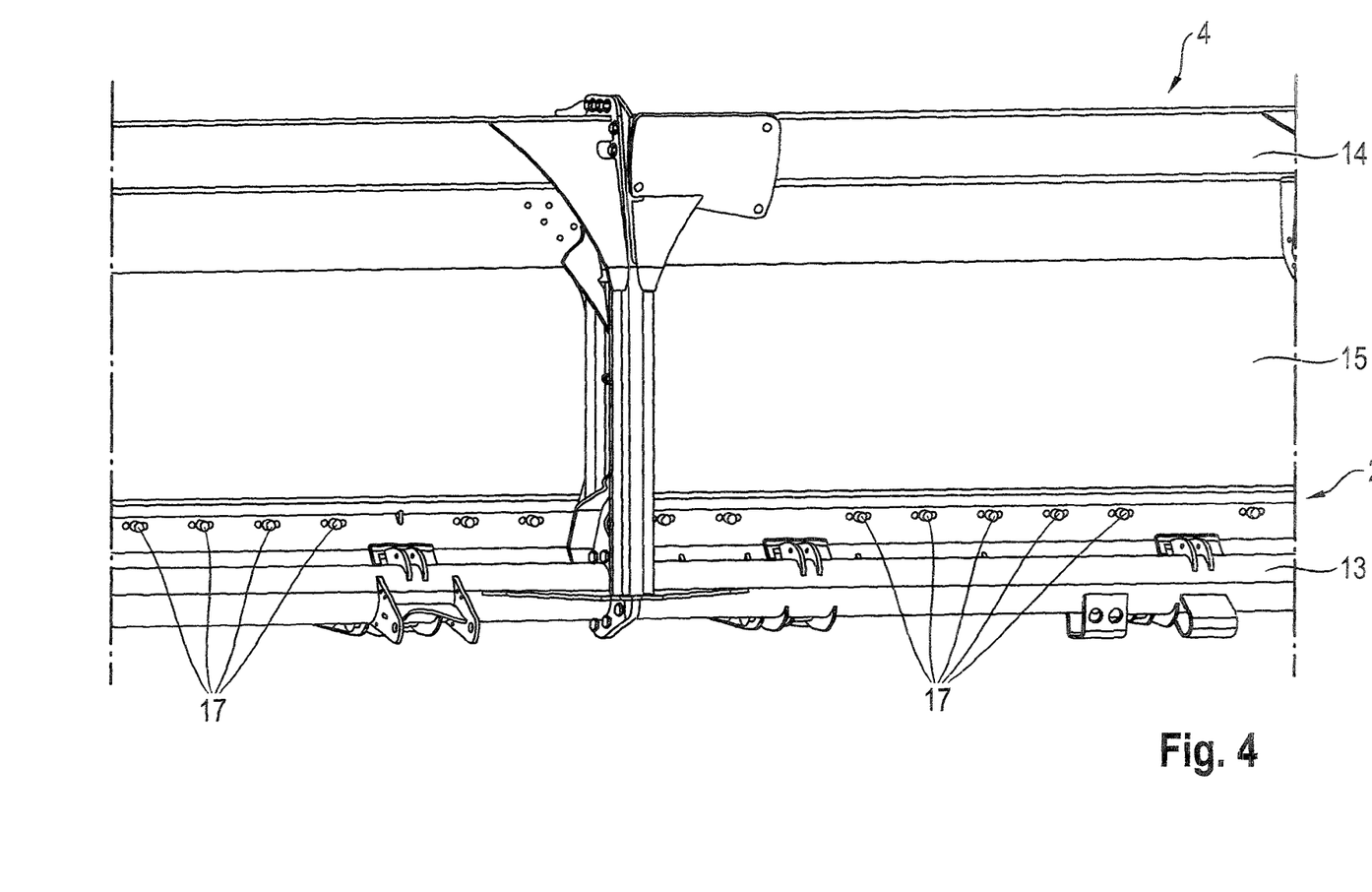
FIG. 4 depicts a partial view of the side section according to FIG. 2, from the rear.

FIG. 4 presents a partial view of the side section 4 according to FIG. 2, from the rear. In a region of the rear panel 15 adjacent to the lower profiled element 13, the supporting elements 17 disposed parallel to one another extend, in sections, through the rear panel 15. Each supporting element 17 is supported via the end section thereof in a sliding joint 21. As is apparent from the depiction in FIG. 5, the supporting arms 16, which support the finger bar 6, swivel about a common rotational axis 23. Axis 23 is axially parallel to the lower profiled element 13, while the supporting elements 17 that support the conveyor belt 7 are supported independently thereof in the rear panel 15.

Figure 5:
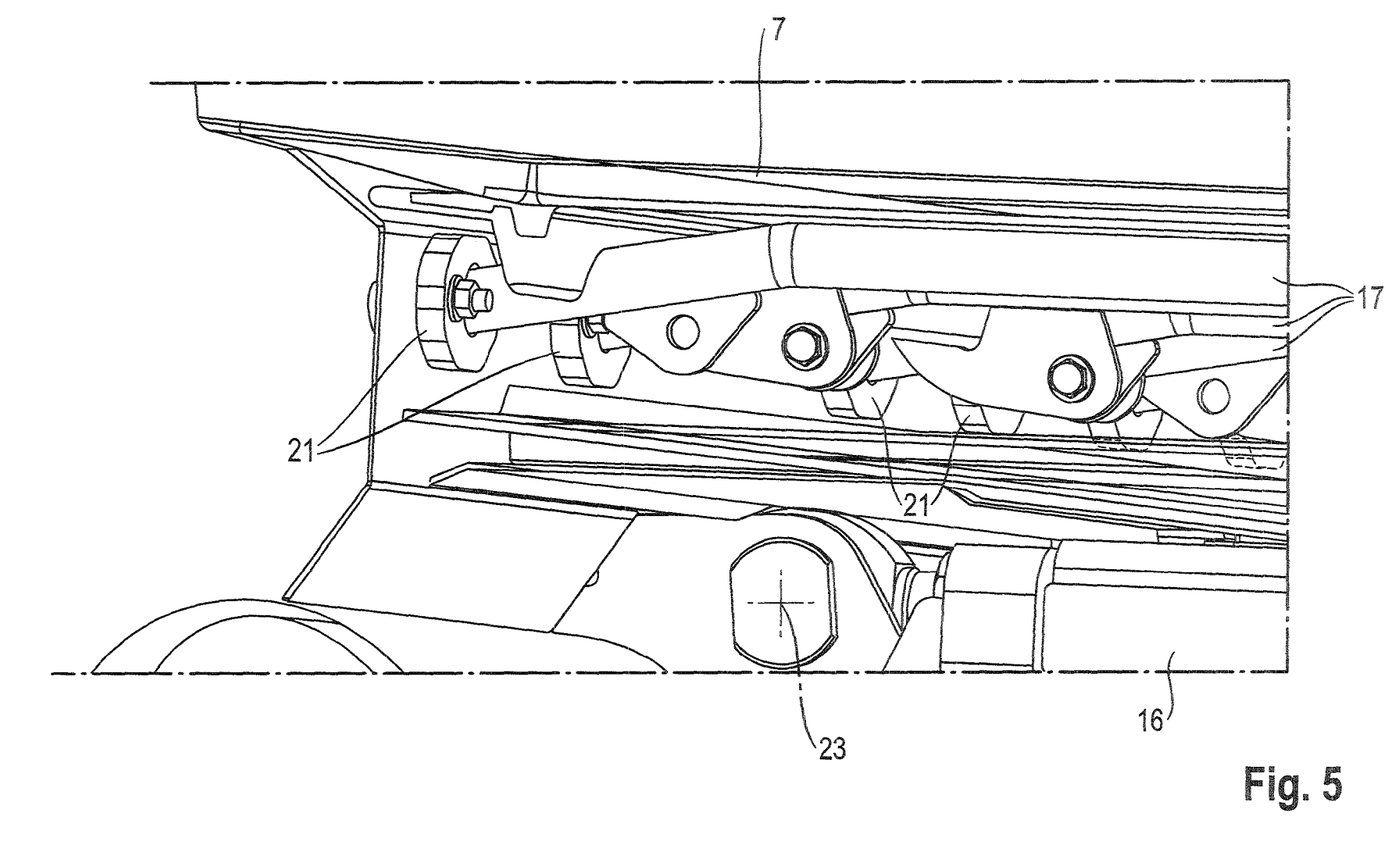
FIG. 5 depicts a perspective view of supporting elements disposed between conveyor belts, according to FIG. 2.

A deflection of the finger bar 6 that is vertical at least in sections results in a rotational motion of at least one of the supporting arms 16 about the common rotational axis 23. The particular supporting elements 17 disposed in the region above the deflected supporting arm 16 also are deflected in the vertical direction, wherein these supporting elements are displaced in a substantially horizontal direction, guided by the particular sliding joint 21. Depending on the type of deflection of the finger bar 6 (i.e., whether the finger bar 6 is partially raised or lowered), this results in a relative motion of the supporting elements 17 with respect to the sliding joints 21 in this region. The relative motion of the supporting elements 17 is limited by the maximum permissible vertical deflection of the finger bar 6, which is supported by the supporting arms 16.

Figure 6:
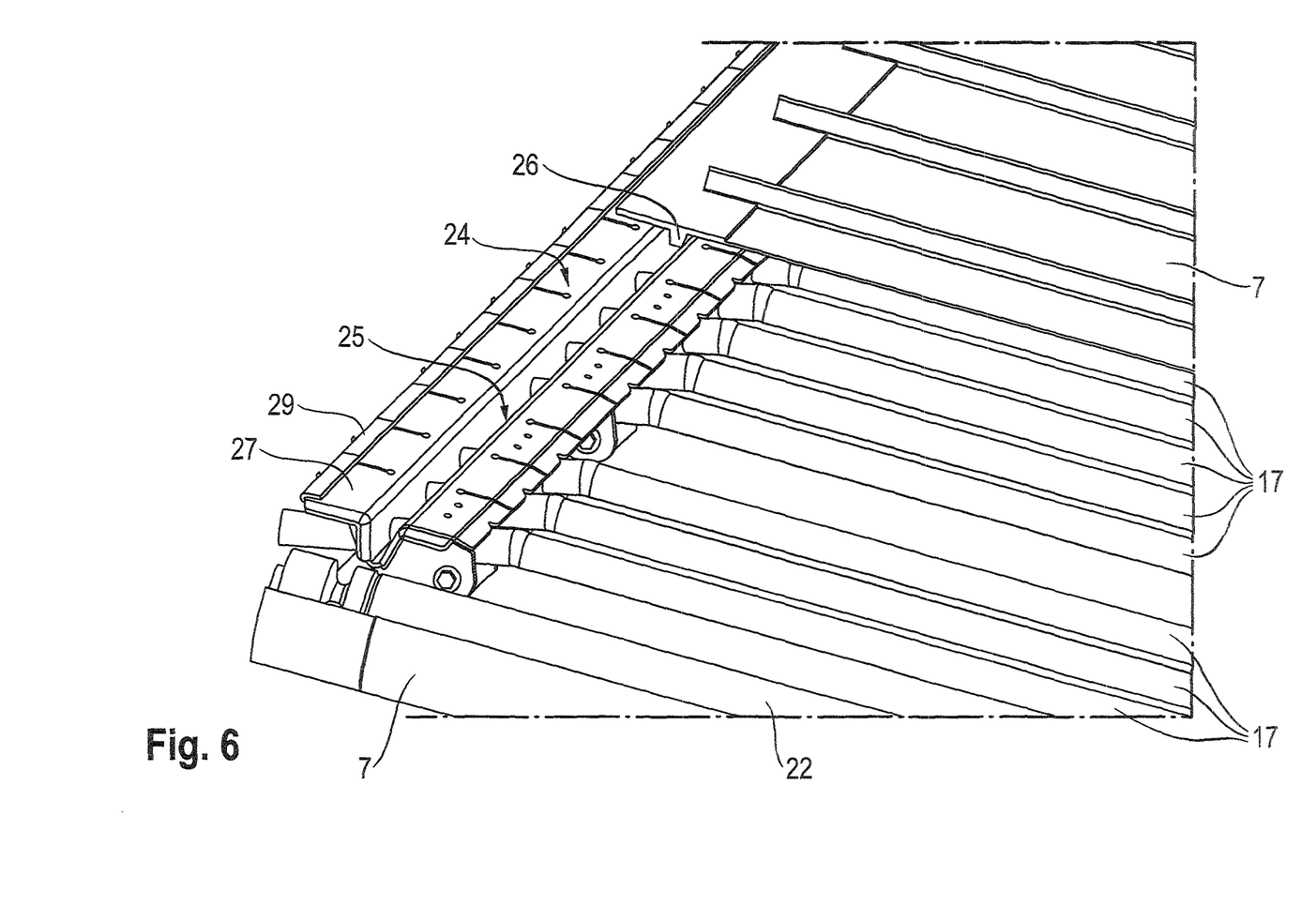
FIG. 6 depicts a partially exposed view of the conveyor belt, diagonally from above.
Figure 7:
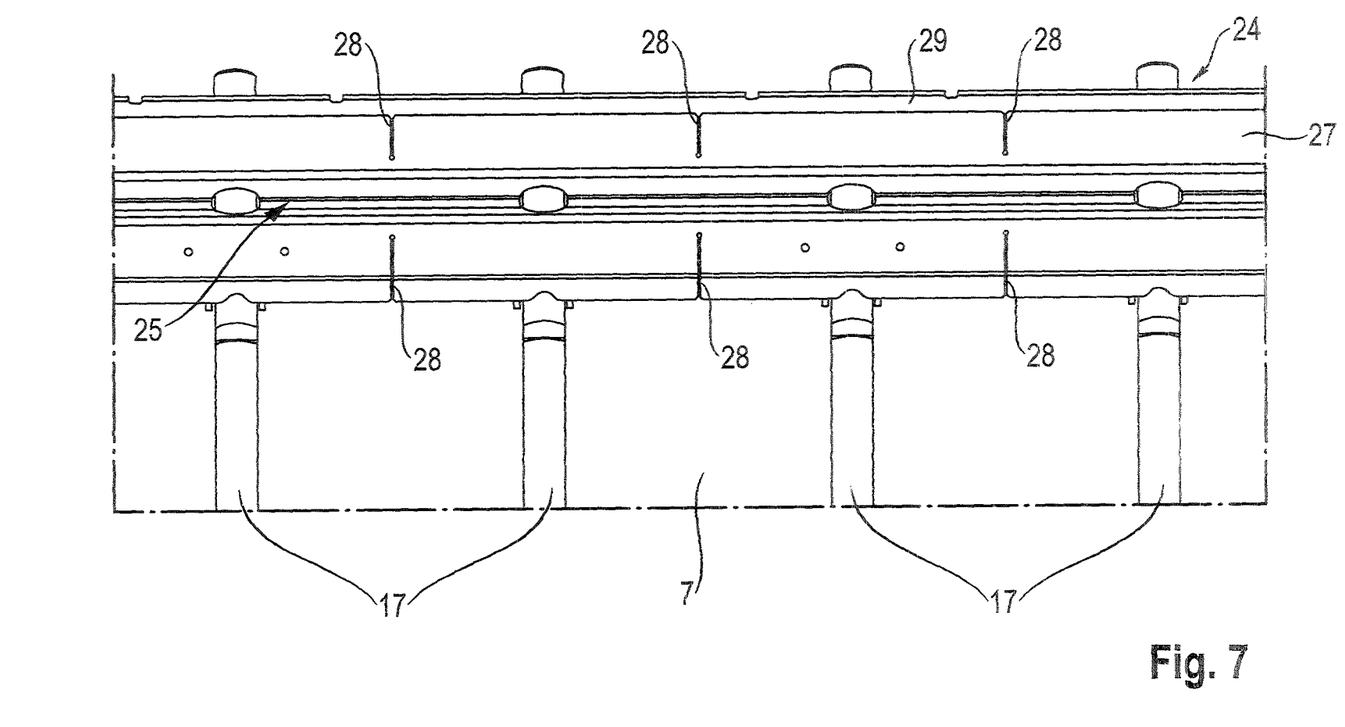
FIG. 7 depicts a detailed view of a belt guide according to FIG. 6.

FIG. 6 shows a partially exposed view of the conveyor belt 7, diagonally from above. FIG. 7 shows a detailed view of a belt guide according to FIG. 6, from above. As is apparent from the depiction of combined in FIGS. 6 and 7, the conveyor belt 7 comprises, on the side thereof facing the supporting elements 17, a guide element 26. The guide element is continuous as viewed in the circumferential direction, e.g., in the form of a rib having a polyhedral cross section, which is accommodated by a belt guide 24 in a guide recess 25 corresponding to the shape of the guide element 26. The belt guide 24 is disposed in a relatively movable manner on the supporting elements 17 at the end sections thereof facing the rear panel 15. It is thereby ensured that, in the event of a partial vertical deflection of the finger bar 6, which results in a horizontal motion of the supporting elements 17 in this region in the direction of the sliding joints 21, the position of the belt guide 24 with respect to the adjacent supporting elements 17 (which do not undergo deflection), is substantially retained in order to ensure uniform circulation of the conveyor belt 7.

The belt guide 24 is designed as at least one profiled, plate-shaped segment 27, which extends, in sections, in the longitudinal direction of the particular supporting element 17 and is penetrated thereby. The segment 27 comprises a wall 29, which extends in sections perpendicularly to the top surface thereof and parallel to the rear panel 15, and which is used to limit the freedom of motion of the conveyor belt 7 in the longitudinal direction of the supporting elements 17. The depiction of the belt guide 24 in the view from above (according to FIG. 7), shows the segment 27 is interrupted in sections by recesses 28 extending parallel to the supporting elements 17. The recesses 28 are disposed opposite one another, thereby resulting in a high degree of torsional and bending flexibility of the belt guide 24. Also, width of the guide groove 25 of the belt guide 24 and, the distance from the wall 29 to the guide groove 25 has a ratio that is selected such that the guidance of the conveyor belt 7 is performed either primarily by the guide rib 26 and the corresponding guide groove 25 or by the wall 29 and the outer edge of the conveyor belt 7. In the event that the finger bar 6 lowers, in sections, relative to a central position, the guidance of the conveyor belt 7 is performed by the guide rib 26 and the corresponding guide groove 25. If the finger bar 6 is partially raised, the guidance of the conveyor belt 7 is performed by the stop face 29 and the outer edge of the conveyor belt 7.

Figure 8:
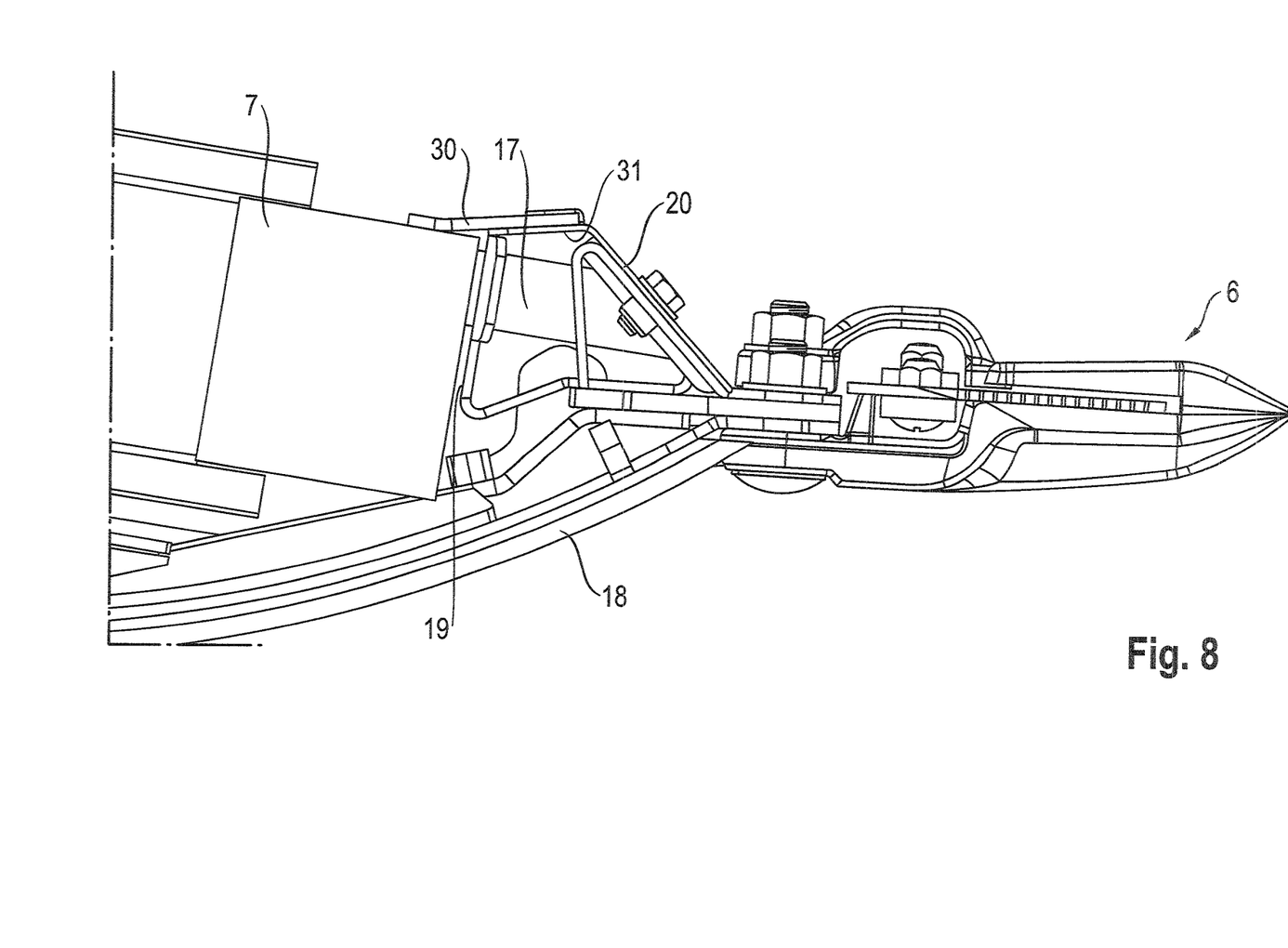
FIG. 8 depicts a partial view of the front region of the header from the side, according to FIG. 1.

FIG. 8 depicts the finger bar 6 and a partial view of the front region of the header 1, from the side. A plurality of crop-guiding elements, which are designed as feed plates 20, are distributed on the finger bar 6, across the width thereof, and are disposed next to one another, slanted at an angle with respect to the finger bar 6. This is highlighted by the depictions in FIGS. 2 and 3. Every crop-guiding element 10 comprises a front edge 31, which lies approximately parallel to the top side of the conveyor belt 7. A continuous sealing belt 30 is fastened at the front edge 31. The sealing belt extends across the width of the respective at least one side section 4 of the header 1 and overlaps the conveyor belt 7 at least in sections. The continuous sealing belt 30 provides a reliable seal even in the event of a height and longitudinal compensation by the movement of the supporting elements 17 caused by the vertical deflection of the finger bar 6.

LIST OF REFERENCE CHARACTERS 1 header
2 main frame
3 middle section
4 side section
5 conveyor device
6 finger bar
7 conveyor belt
8 intake conveyor device
9 floor plate
10 feed roller
10a header auger
11 projection
12 tip
13 profiled element
14 profiled element
15 rear panel
16 supporting arm
17 supporting element
18 header skid shoe
19 contact surface
20 feed plate
21 sliding joint
22 guide roller
23 rotational axis
24 belt guide
25 guide recess
26 guide element
27 segment
28 recess
29 wall
30 sealing belt
31 front edge As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A header comprising a middle section disposed on a main frame;
    at least two side sections disposed adjacent to the middle section;
    a rear panel extending substantially perpendicularly to the main frame;
    a flexible finger bar extending across a width of the header; and
    at least one conveyor device disposed behind the finger bar and designed, on respective ones of the at least two side sections, as at least one continuous conveyor belt that is disposed adjacent to the middle section to transport crop cut by the finger bar laterally in the direction of the middle section;
    wherein the side sections comprise a plurality of supporting arms that are swivellably disposed on the main frame and support the finger bar;
    wherein each side section comprises a plurality of supporting elements for supporting the conveyor belt; and
    wherein each of the supporting elements are supported in a bearing point to be displaceable in the axial direction relative to the main frame.

2. The header according to claim 1, wherein the bearing point of a supporting element is designed as a sliding joint.

3. The header according to claim 1, wherein each of the supporting elements comprises, on an end section thereof facing the finger bar, a contact surface for the conveyor belt.

4. The header according to claim 1, wherein a belt guide is disposed on the supporting elements at end sections of the supporting elements facing the rear panel.

5. The header according to claim 4, wherein the supporting elements are movable relative to the belt guide.

6. The header according to claim 4, wherein the belt guide is penetrated by the supporting elements.

7. The header according to claim 4, wherein the belt guide comprises at least one profiled, plate-shaped segment that extends in sections in the longitudinal direction of the supporting elements.

8. The header according to claim 7, wherein the segment comprises a guide recess extending parallel to the main frame.

9. The header according to claim 7, wherein the segment comprises recesses that extend parallel to the supporting elements and are disposed at a distance from one another.

10. The header according to claim 9, wherein the recesses are disposed on both sides of the guide recess.

11. The header according to claim 7, wherein the segment comprises a wall that extends in sections perpendicularly to a surface of the segment and parallel to the main frame.

12. The header according to claim 1, wherein a plurality of crop-guiding elements are distributed on the finger bar, across a width of thereof and wherein the crop-guiding elements are disposed next to one another finger bar and slanted at an angle with respect to the finger bar.

13. The header according to claim 12, wherein each crop-guiding element comprises a front edge, which lies approximately parallel to the top side of the conveyor belt and wherein a continuous sealing belt is fastened at said front edge and extends extending across a width of one of the side sections and overlaps the conveyor belt (7) at least in sections.

* * * * *

UNITED STATES PATENT AND TRADEMARK OFFICE
CERTIFICATE OF CORRECTION

| | | |
|---|---|---|
| PATENT NO. | : 9,161,492 B2 | Page 1 of 1 |
| APPLICATION NO. | : 14/148023 | |
| DATED | : October 20, 2015 | |
| INVENTOR(S) | : Fuechtling | |

It is certified that error appears in the above-identified patent and that said Letters Patent is hereby corrected as shown below:

Title Page

Insert -- (30) Foreign Application Priority Data
January 14, 2013   (DE)................100322.2 --.

Signed and Sealed this
Eighth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,161,492 B2  Page 1 of 1
APPLICATION NO. : 14/148023
DATED : October 20, 2015
INVENTOR(S) : Fuechtling

It is certified that error appears in the above-identified patent and that said Letters Patent is hereby corrected as shown below:

Title Page

Insert -- (30) Foreign Application Priority Data
      January 14, 2013 (DE)................10 2013 100322.2 --.

This certificate supersedes the Certificate of Correction issued March 8, 2016.

Signed and Sealed this
Nineteenth Day of April, 2016

Michelle K. Lee
*Director of the United States Patent and Trademark Office*